(12) United States Patent  (10) Patent No.: US 7,648,328 B2
Binder et al.  (45) Date of Patent: Jan. 19, 2010

(54) DEVICE FOR RECEIVING AND FOR TRANSPORTING AN ARTICLE

(75) Inventors: Jan Binder, Esslingen (DE); Steffen Mayer, Rutesheim (DE)

(73) Assignee: MULTIVAC Sepp Haggenmueller GmbH & Co. KG, Wolfertschwenden (DE)

( * ) Notice: Subject to any disclaimer, the term of this patent is extended or adjusted under 35 U.S.C. 154(b) by 0 days.

(21) Appl. No.: 12/232,274

(22) Filed: Sep. 12, 2008

(65) Prior Publication Data

US 2009/0074549 A1    Mar. 19, 2009

(30) Foreign Application Priority Data

Sep. 13, 2007  (DE) ................ 10 2007 045 042
Nov. 27, 2007  (DE) ................ 10 2007 058 264
May 9, 2008    (DE) ................ 10 2008 023 762

(51) Int. Cl.
    *B65G 47/90*    (2006.01)
(52) U.S. Cl. ................................... 414/797.2
(58) Field of Classification Search .......... 414/797.2; 271/268; 198/416, 596
    See application file for complete search history.

(56) References Cited

U.S. PATENT DOCUMENTS

| | | | | |
|---|---|---|---|---|
| 3,888,478 A * | 6/1975 | Alderman et al. | ............ | 271/8.1 |
| 4,026,421 A * | 5/1977 | Lotz | ............ | 414/790.4 |
| 4,178,118 A * | 12/1979 | Bailey | ............ | 414/788 |
| 5,022,218 A * | 6/1991 | Prakken | ............ | 53/529 |
| 5,265,712 A * | 11/1993 | Krieg | ............ | 198/512 |
| 5,605,215 A * | 2/1997 | Gross et al. | ............ | 198/345.1 |
| 5,611,658 A * | 3/1997 | Olofsson et al. | ............ | 414/797.3 |
| 5,683,222 A * | 11/1997 | Ingelhag | ............ | 414/801 |
| 6,547,296 B1 * | 4/2003 | Perkitny et al. | ............ | 294/16 |
| 6,880,462 B2 * | 4/2005 | Marincic et al. | ............ | 101/477 |
| 7,144,009 B2 * | 12/2006 | Kim | ............ | 271/276 |
| 7,287,952 B2 * | 10/2007 | Ricci et al. | ............ | 414/796.6 |
| 7,562,923 B2 * | 7/2009 | Han et al. | ............ | 294/119.1 |

FOREIGN PATENT DOCUMENTS

| | | |
|---|---|---|
| DE | 30 24 192 A1 | 3/1981 |
| GB | 2 378 432 A | 2/2003 |
| JP | 57-151533 | 9/1982 |
| WO | WO 99/00036 | 1/1999 |
| WO | WO 2005/051812 | 6/2005 |
| WO | WO 2007/093774 A | 8/2007 |

* cited by examiner

*Primary Examiner*—Douglas A Hess
(74) *Attorney, Agent, or Firm*—Breneman & Georges

(57) ABSTRACT

Device for receiving and for transporting an article, which device has receiving means which are slid under the article by a sliding means, the receiving means being formed by a belt which revolves around deflections means, the deflection means being formed by tensioning struts (26) which are tensioned relative to one another and are arranged on the sliding means (20).

18 Claims, 6 Drawing Sheets

DEVICE FOR RECEIVING AND FOR TRANSPORTING AN ARTICLE

CROSS-REFERENCE TO RELATED APPLICATIONS

The subject matter of this application is related to the subject matter of U.S. application Ser. No. 12/232,273 titled, "Device For Receiving And For Transporting An Article" filed Sep. 12, 2008 and U.S. application Ser. No. 12/232,272 titled, "Device For Receiving And For Transporting An Article" filed Sep. 12, 2008.

BACKGROUND OF THE INVENTION (1) Field of the Invention

The invention relates to a device for receiving and for transporting an article, which device has receiving means which are slid under the article by a sliding means, the receiving means being formed by a belt revolving via deflections means. The device can then be received by a robot and brought to a different location where the article is deposited again.

(2) Description of Related Art Including Information Disclosed under 37 C.F.R. 1.97 and 1.98

Devices of this type are known for example from WO 99/0036, JP 57-151533 and WO 2005/051812.

The transportation of articles of this type presents particular problems when said articles are so flexible (for example a slice of sausage, cheese or meat) that they are compressed when they are received by the receiving means. Special measures must then be taken to avoid this.

A further problem of the arrangement is presented by the precise positioning of the arrangement by means of a robot via the retrieval plane. Owing to the dynamics of the robot and the control accuracy associated therewith and also the kinematic elasticity, positional accuracy inevitably occurs by way of the retrieval position. For this reason, it is necessary to position the robot at a minimum distance above the retrieval plane, so that no collision takes place between the arrangement and the retrieval plane. However, this minimum distance makes it difficult to pick up products. In extreme cases, products with a thickness which is less than the minimum distance cannot be gripped.

GB 2 378 432 A discloses an arrangement in which gripping fingers are placed from both sides on a cake in order to hold and lift up said cake with a certain pressure. In order to be able to raise the cake, the gripping fingers are configured so as to have a plate via which a belt is drawn. The belt is in contact with the item. If it is drawn via the plate, it takes the item with it.

A similar arrangement, in which however the plate is moved not vertically but rather horizontally, is described in WO 2007/093774 A1. In this case, it is a problem that during each movement cycle a spring has to be tensioned over the entire path of movement of the belt and that furthermore, during its movement over the plate, the belt is subject to wear owing to the friction on the plate.

A further arrangement of the type mentioned in the preamble is described in the Applicant's own earlier German application 10 2007 045 042.

BRIEF SUMMARY OF THE INVENTION

The object of the present invention is to provide, avoiding these drawbacks, a device of the type mentioned at the outset in which the article is received in a simpler and more reliable manner.

According to the invention, this object is achieved in that the deflection means are formed by tensioning struts which are tensioned relative to one another and are attached to the sliding means and are displaced therewith.

This brings about low-friction mounting of the belt ensuring a significantly longer service life.

Also, the belt is moved reliably and without the arrangement of a spring. The arrangement of the tensioning struts on the sliding means by a resilient suspension, which is preferably formed by a leaf spring, allows positional inaccuracy of the robot to be compensated for, in particular if the sliding means is positioned obliquely relative to the surface on which the article rests.

Arrangements of this type can be used not only, as mentioned hereinbefore, in the food industry but rather also in the transportation of electronic components in which, despite being rigid, any type of relative movement between grippers and the surface must be avoided in order not to scratch the surfaces. Examples include semiconductor wafers.

BRIEF DESCRIPTION OF THE SEVERAL VIEWS OF THE DRAWING(S)

Exemplary embodiments of the invention and advantageous developments thereof will be described hereinafter with reference to the appended drawings in which.

DETAILED DESCRIPTION OF THE INVENTION INCLUDING BEST MODE

Figure 1:
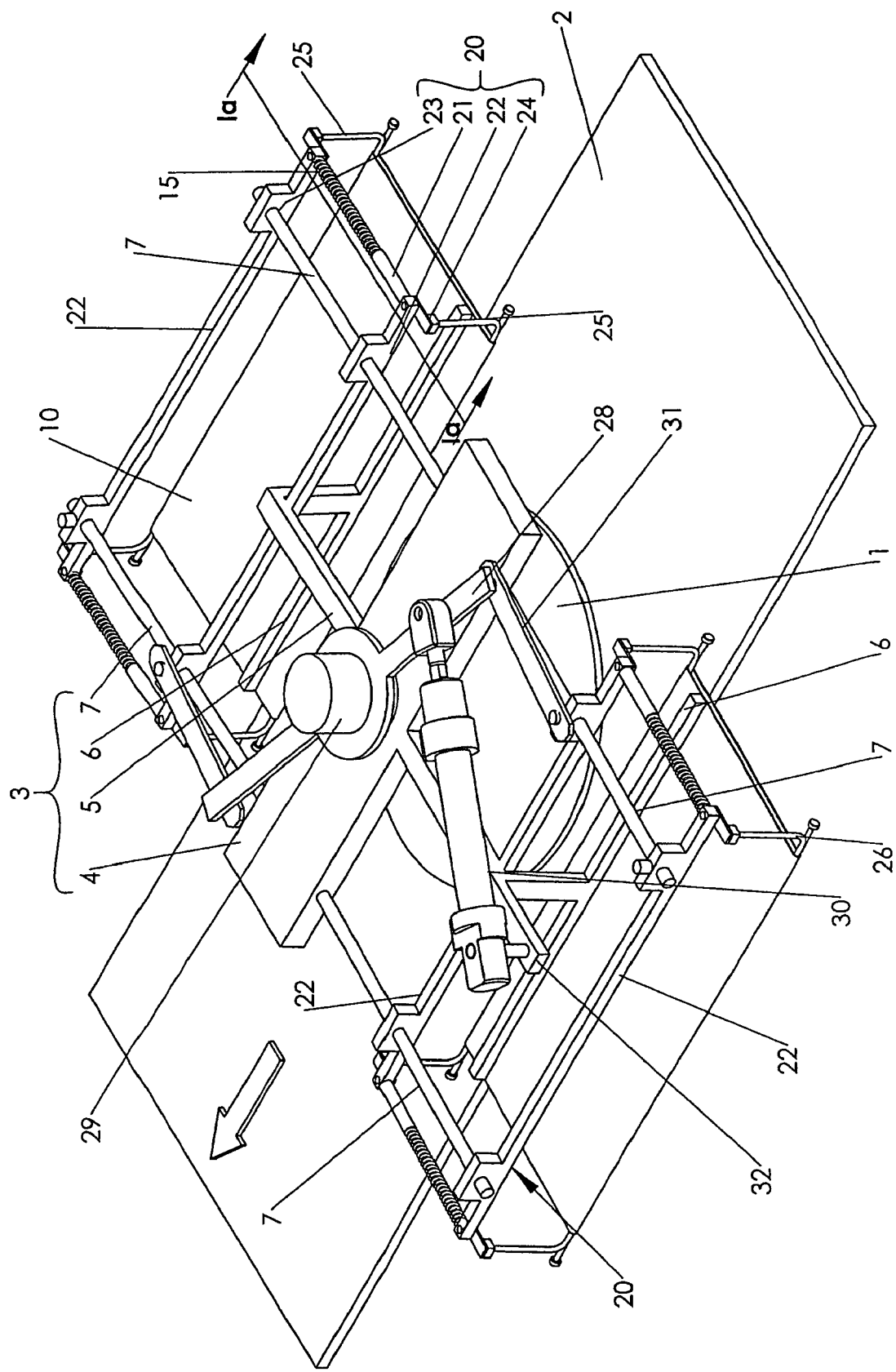
FIG. 1 shows a first exemplary embodiment.
Figure 2:
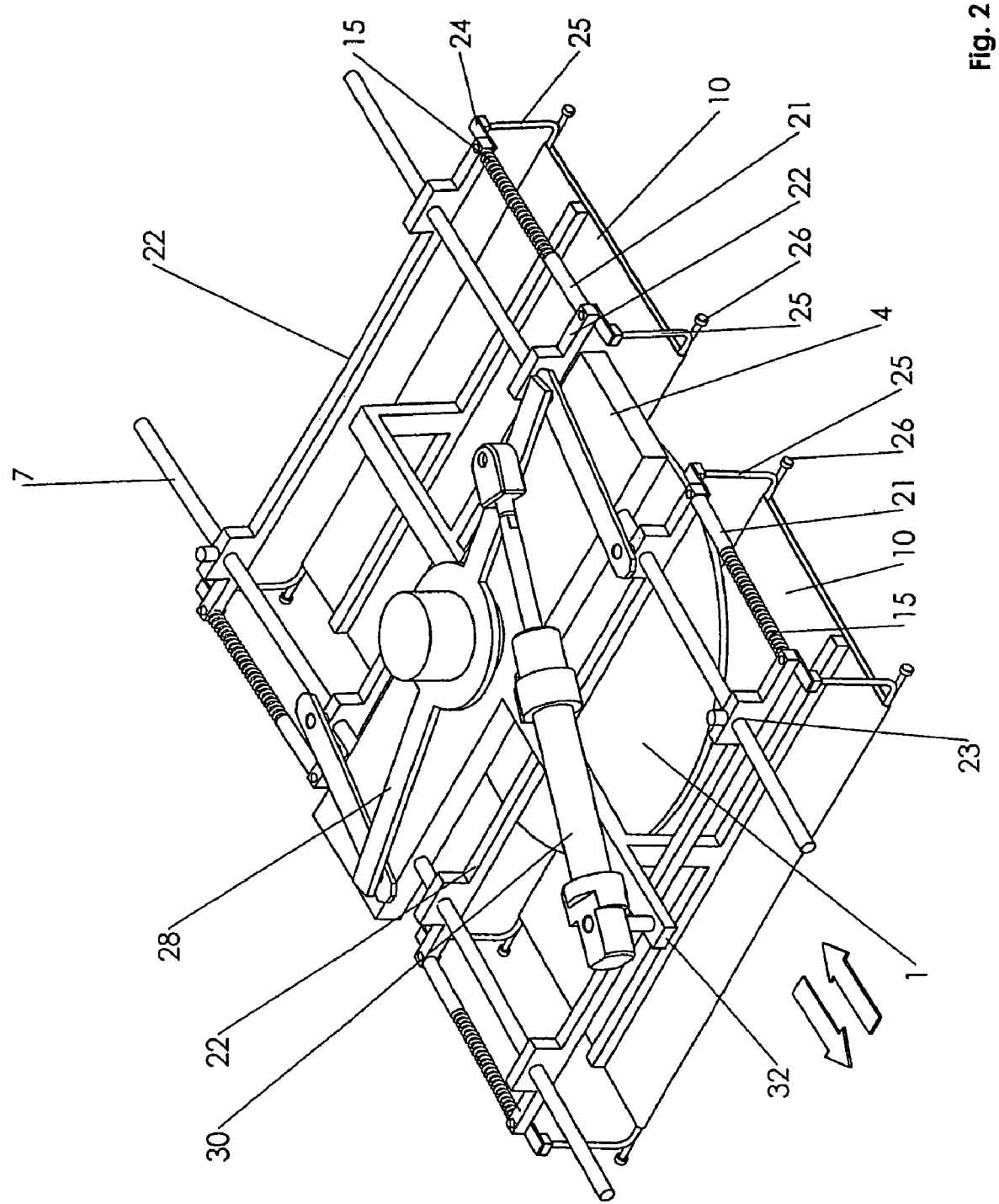
FIG. 2 shows the exemplary embodiment according to FIG. 1 in a position in which an article 1 is received.
Figure 3:
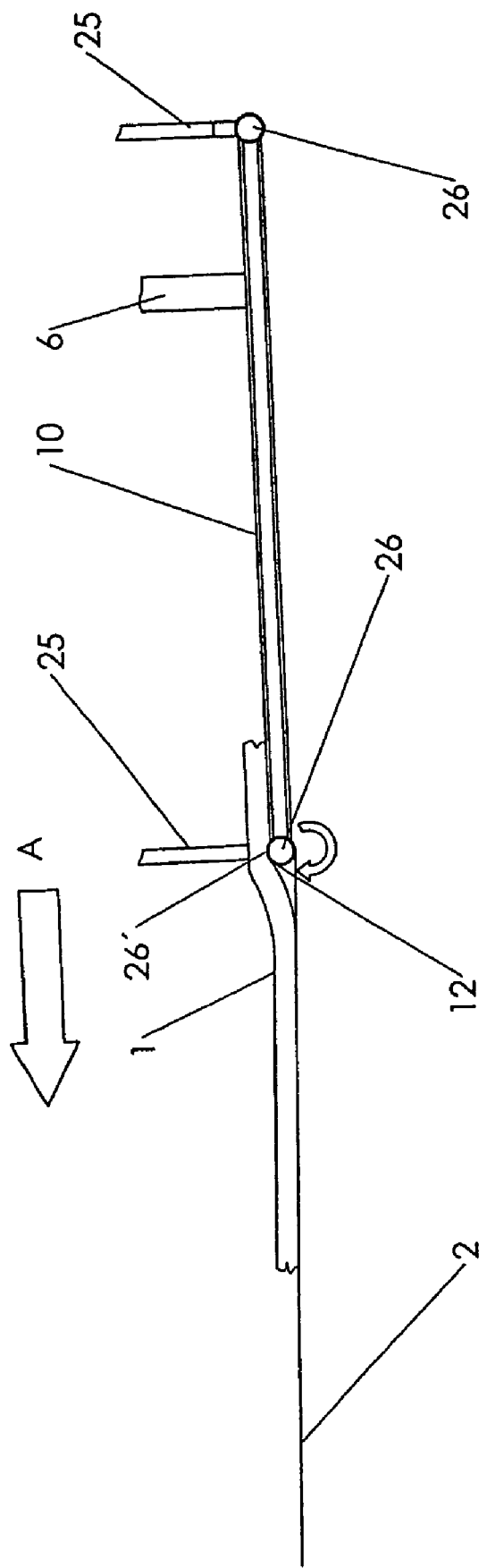
FIG. 3 shows the exemplary embodiment once the sliding units have been moved toward one another and the belt 10 has reached under an article 1.

As may be seen from FIGS. 1 to 3, the article 1 to be received lies for example on a conveyor belt 2. The conveyor belt forms in the exemplary embodiment, in the sense of the claims, the surface on which the article 1 rests. The device serves to receive the article 1, so that the device can be transported with the received article 1 by a robot, which acts on the bearing 29 configured as a hub, to a different location and be deposited there.

The device has a box-type frame structure 3 formed by a plate 4, a U-shaped bracket 5, transverse struts 6 and guide rods 7 attached to the plate 4.

The device also has a sliding means 20 formed by crossbars 22, tensioning rods 21 arranged therebetween, leaf springs 24 attached to the crossbars 22, tensioning brackets 25 attached to said leaf springs, and also tensioning struts 26 connecting the tensioning brackets 25. The crossbars 22 are provided with guide openings 23 through which the guide rods 7 extend, so that the sliding units 20 are displaceable on the stationary guide rods 7.

Figure 1A:
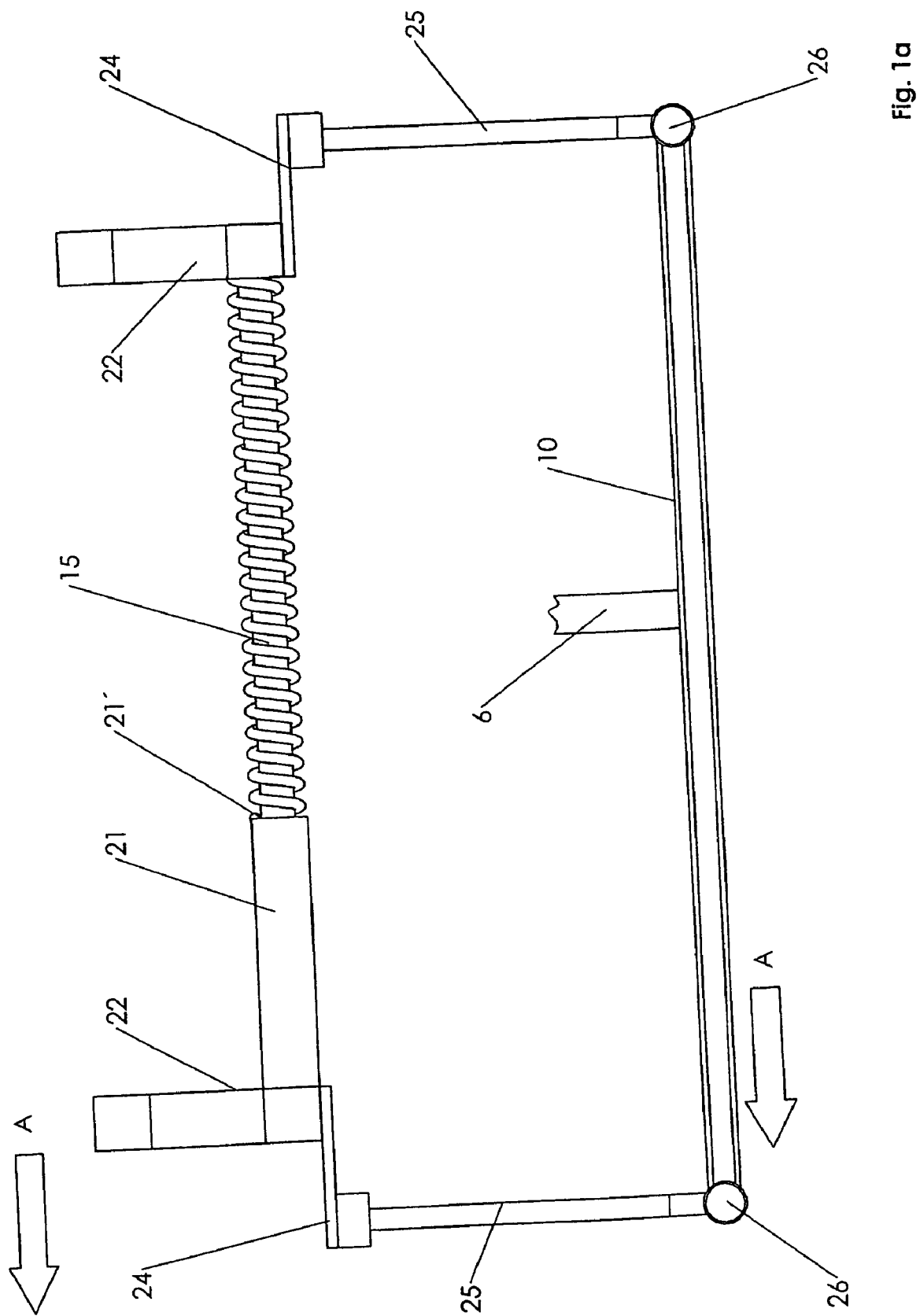
FIG. 1a is a section in the direction of the arrows Ia-Ia in FIG. 1.

The crossbars 22 are pressed apart from one another by the tensioning rod 21. This takes place, as may be seen from FIG. 1a, as a result of the fact that one crossbar (on the left in FIG. 1a) is secured to the tensioning rod 21, and a spring 15, which acts between a stop 21' of the tensioning rod 21 and the other crossbar 22, is also provided. This also tensions the belt 10 which has a closed cross section and is deflected by and revolves via the tensioning struts 26 (cf. FIG. 1a).

The bearing 29 pivotably mounts a pivot lever 28 on the plate 4. The piston rod of a piston/cylinder arrangement 30, which is supported on a boom 32 of the U-shaped bracket 5, acts on the pivot lever 28. Via the toggle lever 31, which is articulated to a crossbar 22 of each sliding unit 20, the sliding means 20 are thus first displaced toward one another on actuation of the piston/cylinder arrangement 30. Equally, the sliding means 20 can be moved away from one another to deposit the article 1 (see the arrows in FIG. 2).

If the sliding means 20 are moved toward one another in direction A (FIGS. 1a and 3), the two tensioning brackets 25 pertaining to a sliding means, and with them the tensioning struts 26, also move in the same direction. The belt 10 is however fastened to the transverse strut 6 which is part of the stationary, box-type frame structure 3. This leads to movement of the lower part of the belt 10 also in direction A, as the belt 10 is secured to the transverse strut 6. The belt 10 is therefore, as it revolves around the tensioning struts 26, displaced and slides, as may be seen from FIG. 3, rolling down from below under the article 1 and lifts said article, albeit along the region 12 of contact between the article 1 and belt 10 without horizontal relative movement between the article 1 and belt 10. No frictional force, which might act on the article 1, is therefore produced in the horizontal direction. In order to facilitate the procedure and to reduce the friction of the belt 10 on the tensioning strut 26, said tensioning strut is also surrounded by a rotatable sleeve 26'.

Figure 4:
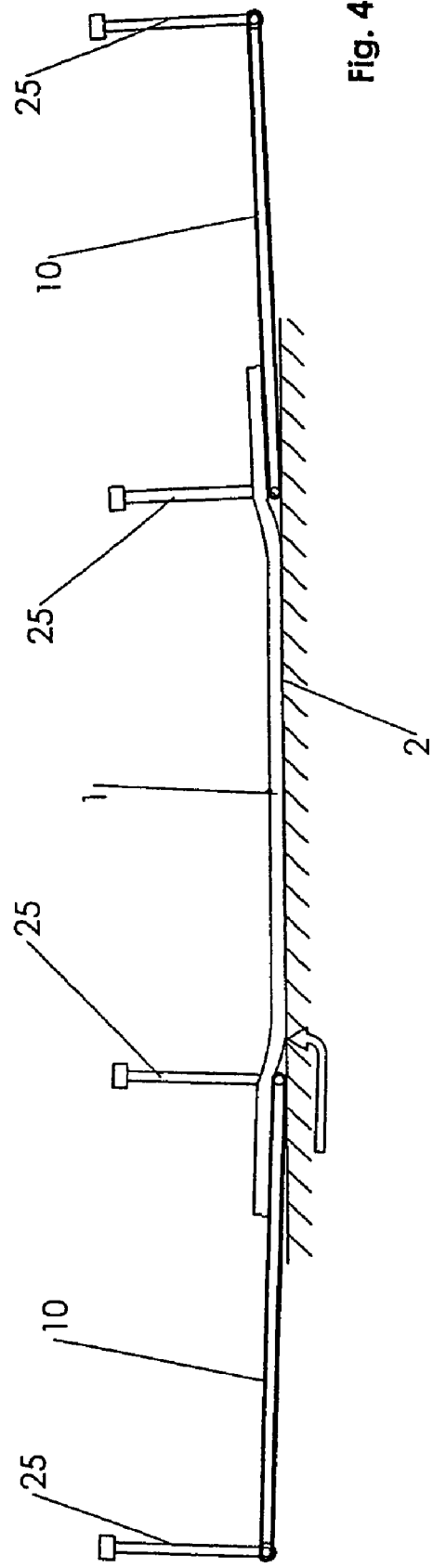
FIG. 4 is a schematic view of certain components in a second exemplary embodiment.

FIG. 4 shows schematically an arrangement in which the two sliding means 20 are inclined slightly obliquely on both sides of the article 1 relative to the surface of the transportation belt 2 or any other surface on which the article rests. The angle is from 0.5-1.0°. This minimizes the friction between the moving belt 10 and the bearing surface or the conveyor belt 2. In this case, the tensioning brackets 25, which, when the tensioning means 20 is positioned obliquely relative to the surface 2, first strike the surface 2, can as a result compensate for positional inaccuracy caused by the dynamics of a robot, as they are suspended by means of the leaf springs 24 (see FIG. 1a) resiliently, i.e. flexibly.

Figure 5:
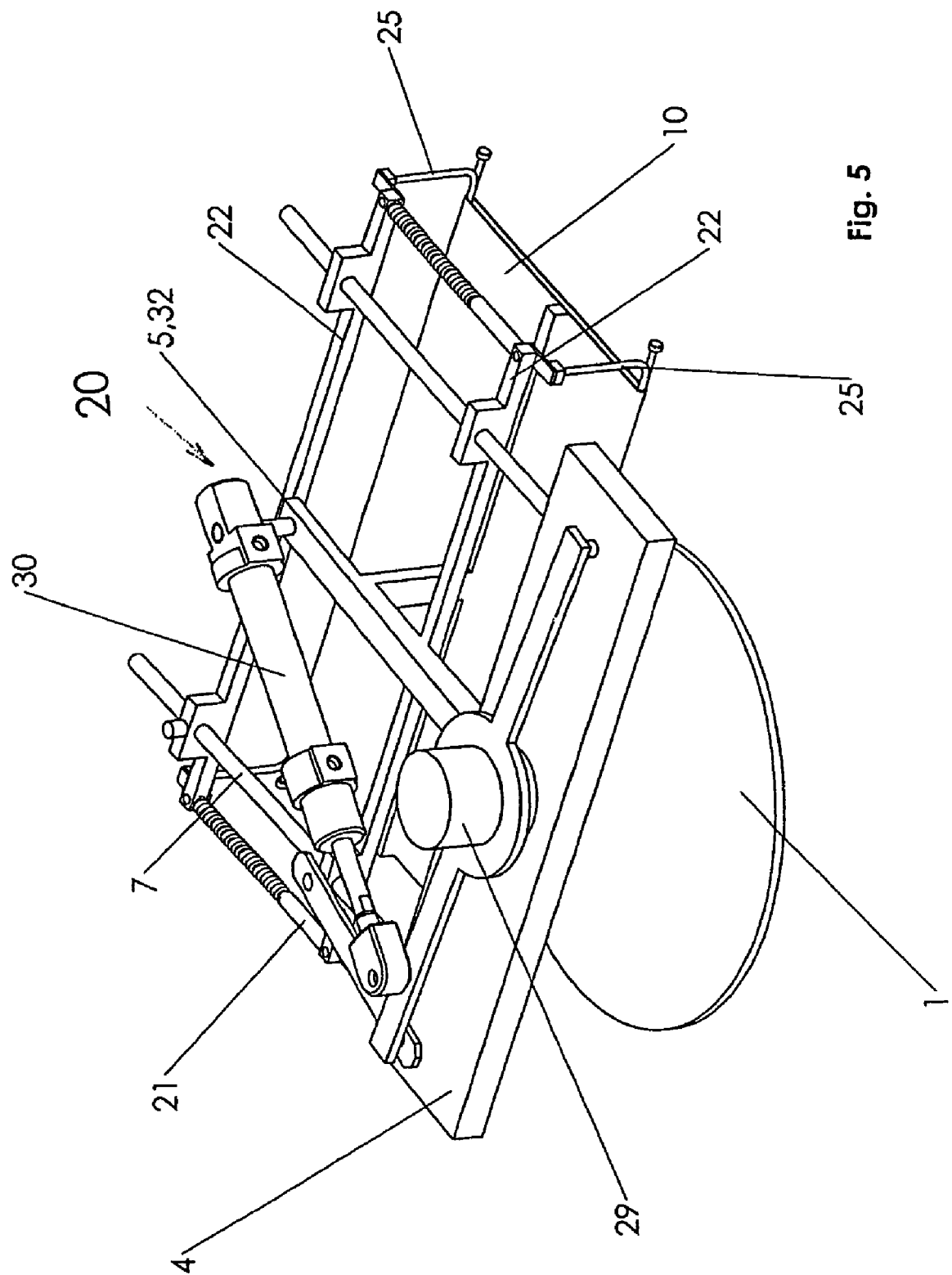
FIG. 5 shows a third exemplary embodiment.

FIG. 5 shows a further exemplary embodiment in which a sliding device 20 is arranged merely on one side of the article 1 to be received. Otherwise, the parts are the same.

LIST OF REFERENCE NUMERALS

1 Article
2 Conveyor belt
3 Box-type frame structure
4 Plate
5 U-shaped bracket
6 Transverse strut
7 Guide rods
10 Revolving belt
12 Contact region
15 Spring
20 Sliding means
21 Tensioning bracket
21' Shoulder (stop)
22 Crossbar
23 Guide openings
24 Leaf spring
25 Tensioning bracket
26 Tensioning strut
26' Sleeve
28 Pivot lever
29 Bearing
30 Piston/cylinder arrangement
31 Toggle lever
32 Boom

What is claimed is:

1. In a device for receiving and for transporting an article from a moving surface having a receiving means which is slid under the article by a sliding means, wherein the improvement comprises a sliding means (20) moving substantially perpendicular to the moving surface, said receiving means having an endless belt disposed between a pair of rollers wherein one of said pair of rollers has at each end tensioning struts (26) which are tensioned relative to one another on the sliding means (20).

2. The device according to claim 1 wherein the sliding means (20) is displaceable relative to a stationary unit (3) and the tensioning struts (26) are arranged on the sliding means (20), the sliding means being positioned obliquely relative to the bearing surface (2) of the article (1).

3. The device according to claim 1 or 2 wherein the sliding means (20) has two tensioning struts (26) which are pressed apart from each other by springs (15).

4. The device according to claim 1 wherein the tensioning struts (26') are disposed on a suspension (24) which is resilient in the direction of the surface (2) on which the article (1) rests.

5. The device according to claim 4 wherein the resilient suspension is formed by a leaf spring (24).

6. The device according to claim 1 or 4 wherein the belt (10) is positioned obliquely relative to the surface (2) on which the article (1) rests.

7. An apparatus for conveying flexible articles or articles covered by a flexible wrapping comprising:
   (a) a reciprocal sliding means having a receiving means for sliding under an article;
   (b) a receiving means having at least two rollers interconnected by an endless belt;
   (c) a pair of tensioning struts disposed at an angle substantially perpendicular to an axis of rotation of one of said two rollers and disposed on each end of at least one of said two rollers; and
   (d) mechanical means for interconnecting and synchronizing the rotational speed of said at least two rollers with a speed of said reciprocal sliding means.

8. The apparatus of claim 7 wherein said pair of tensioning struts are tensioned by springs.

9. The apparatus of claim 8 wherein said springs are leaf springs.

10. The apparatus of claim 7 further comprising a second reciprocal sliding means, and a second receiving means.

11. The apparatus of claim 10 wherein said mechanical means is disposed between said reciprocal sliding means and said second reciprocal sliding means.

12. The apparatus of claim 11 wherein said second receiving means also has at least two rollers and a pair of tensioning struts.

13. The apparatus of claim 7 wherein said mechanical means for interconnecting and synchronizing is a piston cylinder combination and a combination of links and levers.

14. A device for conveying flexible articles or packages comprising:
   (a) a slidable assembly;
   (b) a receiving means having an endless belt disposed between a pair of rollers, each of said rollers having an attachment end;

(c) a combination of mechanical links and levers connecting said slidable assembly to said receiving means and said endless belt; and (d) a tensioning device disposed substantially perpendicular to said endless belt and interconnected to each attachment end of at least one of said pair of rollers.

15. The device of claim 14 wherein said tensioning device is tensioned by springs.

16. The device of claim 15 wherein said springs are leaf springs.

17. The device of claim 14 further comprising a piston cylinder combination for actuating said mechanical links and levers.

18. The device of claim 14 further comprising:

(e) a second slidable assembly disposed substantially transverse to said slidable assembly;

(f) a second receiving means having a second endless belt disposed between a second pair of rollers, each of said second pair of rollers having an attachment end, said second receiving means disposed substantially transverse to said receiving means; and (g) a second tensioning device disposed substantially perpendicular to said second endless belt and interconnected to each attachment end of at least one of said second pair of rollers.

\* \* \* \* \*